US012557820B2

(12) United States Patent　　(10) Patent No.:　US 12,557,820 B2
Rusko　　(45) Date of Patent:　Feb. 24, 2026

(54) ARRANGEMENT AND METHOD FOR AUTOMATICALLY REMOVING A STRIP CONSISTING OF DARK MEAT FROM A FISH FILLET

(71) Applicant: NORDISCHER MASCHINENBAU RUD. BAADER GMBH + CO. KG, Lübeck (DE)

(72) Inventor: Torsten Rusko, Herrnburg (DE)

(73) Assignee: NORDISCHER MASCHINENBAU RUD. BAADER GMBH + CO. KG, Lubeck (DE)

( * ) Notice: Subject to any disclaimer, the term of this patent is extended or adjusted under 35 U.S.C. 154(b) by 0 days.

(21) Appl. No.: 17/930,195

(22) Filed: Sep. 7, 2022

(65) Prior Publication Data

US 2023/0000095 A1　　Jan. 5, 2023

Related U.S. Application Data

(63) Continuation of application No. 17/439,373, filed as application No. PCT/EP2019/058973 on Apr. 9, 2019, now abandoned.

(51) Int. Cl.
*A22C 25/16*　　(2006.01)
*A22C 17/00*　　(2006.01)
(Continued)

(52) U.S. Cl.
CPC .......... *A22C 25/16* (2013.01); *A22C 17/0086* (2013.01); *A22C 25/08* (2013.01);
(Continued)

(58) Field of Classification Search
CPC ....... A22C 25/08; A22C 25/16; A22C 25/166; A22C 25/18; A22C 17/0086; B26D 1/24;
(Continued)

(56) References Cited

U.S. PATENT DOCUMENTS

| | | | |
|---|---|---|---|
| 2,565,727 | A | 8/1951 | Henderson |
| 3,800,363 | A | 4/1974 | Apeyre |

(Continued)

FOREIGN PATENT DOCUMENTS

| | | |
|---|---|---|
| CN | 103781360 A | 5/2014 |
| CN | 104219956 A | 12/2014 |

(Continued)

OTHER PUBLICATIONS

Isaac Maw, The What, Why and How of Delta Robots (Mar. 2018), obtained from https://www.engineering.com/the-what-why-and-how-of-delta-robots/ on Jan. 3, 2025 (Year: 2018).*

(Continued)

*Primary Examiner* — Evan H MacFarlane
(74) *Attorney, Agent, or Firm* — Dinsmore & Shohl LLP

(57)　　ABSTRACT

An arrangement for automatically removing a strip of dark meat from a fish fillet has a conveying unit for transporting the fish fillet from an inlet to an outlet area in a transport direction along a transport path. Starting from the inlet area, successively along the transport path, are provided: a detector for detecting dark meat; a first cutting apparatus for removing a middle partial strip of dark meat; an opener for opening up the fillet such that the cut surfaces of a ventral-side partial and of a dorsal-side partial strip of dark meat point upwards; a cutting unit for removing the partial strips, the cutting unit comprising second and third cutting apparatuses for removing the ventral and dorsal-side partial strips. A control device is connected to the detector and the cutting apparatus, and all cuts are based on information from the detector.

21 Claims, 7 Drawing Sheets

(51) Int. Cl.

| | |
|---|---|
| *A22C 25/08* | (2006.01) |
| *A22C 25/18* | (2006.01) |
| *B25J 9/00* | (2006.01) |
| *B25J 9/16* | (2006.01) |
| *B25J 11/00* | (2006.01) |
| *B26D 1/24* | (2006.01) |
| *B26D 7/06* | (2006.01) |
| *B26D 7/26* | (2006.01) |

(52) U.S. Cl.
CPC ............ *A22C 25/18* (2013.01); *B25J 9/0093* (2013.01); *B25J 9/1697* (2013.01); *B25J 11/0045* (2013.01); *B25J 11/0055* (2013.01); *B26D 1/24* (2013.01); *B26D 7/06* (2013.01); *B26D 7/26* (2013.01); *B26D 2210/02* (2013.01)

(58) Field of Classification Search
CPC ........ B26D 7/06; B26D 7/26; B26D 2210/02; B25J 9/0093; B25J 9/1697; B25J 11/0045; B25J 11/0055; B65G 2201/02; B65G 17/38; B65G 17/40; B65G 23/06; B65G 2201/0202
USPC ......................................... 452/157, 161, 162
See application file for complete search history.

(56) References Cited

U.S. PATENT DOCUMENTS

| | | | | | |
|---|---|---|---|---|---|
| 3,840,939 | A | | 10/1974 | Yamanashi | |
| 5,167,570 | A | * | 12/1992 | Ryan ...................... | A22C 25/16 452/160 |
| 5,580,306 | A | * | 12/1996 | Young .................. | A22B 5/0035 452/148 |
| 8,956,205 | B2 | | 2/2015 | Kowalski | |
| 9,125,424 | B2 | | 9/2015 | Jürs et al. | |
| 9,351,498 | B2 | | 5/2016 | Grimm et al. | |
| 9,532,582 | B2 | * | 1/2017 | Jürs ........................ | A22C 25/16 |
| 10,051,872 | B2 | | 8/2018 | Finke et al. | |
| 11,006,645 | B2 | | 5/2021 | Jürs et al. | |
| 2005/0014461 | A1 | * | 1/2005 | Eilersten ................ | A22C 25/08 452/161 |
| 2011/0207388 | A1 | * | 8/2011 | Hansen ................ | B25J 11/0045 452/121 |
| 2018/0153182 | A1 | * | 6/2018 | Finke ..................... | A22C 25/16 |
| 2020/0329723 | A1 | | 10/2020 | Jurs et al. | |
| 2021/0127691 | A1 | * | 5/2021 | Nielsen .................. | B26D 5/007 |

FOREIGN PATENT DOCUMENTS

| | | | | | |
|---|---|---|---|---|---|
| CN | 104919273 | A | 9/2015 | | |
| CN | 107666830 | A | 2/2018 | | |
| EP | 2755018 | A1 | 7/2014 | | |
| EP | 3409125 | A1 | 12/2018 | | |
| GB | 1033673 | A | 6/1966 | | |
| GB | 1461992 | A | 1/1977 | | |
| SU | 923348 | A3 | 4/1982 | | |
| TW | 572286 | B | 3/2017 | | |
| WO | 89/10698 | A1 | 11/1989 | | |
| WO | WO-2016139611 | A2 | * | 9/2016 | ......... A22C 17/0006 |
| WO | 2018/219907 | A1 | 12/2018 | | |

OTHER PUBLICATIONS

International Search Report dated Jan. 7, 2020; International Application PCT/EP2019/058973.

* cited by examiner

ARRANGEMENT AND METHOD FOR AUTOMATICALLY REMOVING A STRIP CONSISTING OF DARK MEAT FROM A FISH FILLET

CROSS-REFERENCE TO RELATED APPLICATIONS

This application is a continuation of U.S. application Ser. No. 17/439,373 filed Sep. 14, 2021 entitled, "ARRANGE-MENT AND METHOD FOR AUTOMATICALLY REMOVING A STRIP CONSISTING OF DARK MEAT FROM A FISH FILLET," which is the U.S. National Stage of PCT/EP2019/058973 filed Apr. 9, 2019, the content is incorporated herein by reference in its entirety.

FIELD OF THE INVENTION

The invention relates to an arrangement, designed and configured for automatically removing a strip consisting of red meat, the so-called dark meat, from a fish fillet.

The invention also relates to a method for automatically removing a strip consisting of red meat, the so-called dark meat, from a fish fillet.

BACKGROUND OF THE INVENTION

When processing tuna and similar species that undertake long-distance migrations and accordingly have a particular muscle structure, due consideration must be given to the special characteristics of the muscle structure. Taking tuna as an example, the fish fillets detached from the skeleton, and in particular from the backbone/central bone, show an inhomogeneous muscle structure. This means that there are different proportions of meat and muscle. In addition to the "normal" muscle meat, which is usually light-coloured, the fish fillets also have a region of dark muscle meat starting from the region of the (removed) central bone towards the skin side. The dark muscle meat, the so-called red meat, is of inferior quality in terms of taste such that it should be removed as completely as possible.

The region of the central bone divides the fish fillet into a notional dorsal-side partial fillet and a ventral-side partial fillet. In other words, the region of the fish fillet which extends upwards, starting from the central bone towards the dorsal fins, is referred to as the dorsal-side partial fillet, while the region of the fish fillet which extends downwards, starting from the central bone towards the abdominal cavity, is referred to as the ventral-side partial fillet. The term "fish fillet" refers not only to such products which no longer have any bones at all but also, in particular, to such products in which at least the central bone is removed so that the strip of red meat on the side directed away from the skin side is exposed. Accordingly, the fish fillets are processed with the skin side down.

The spread of the red meat, however, also referred to as dark meat, within the fish fillet makes it impossible to remove it with common cutting apparatuses in which, for example, two circular knives set in a V-shape to each other cut a V-shaped strip from the fish fillet. The spread of the red meat actually deviates from a classic V-shape and varies from fish fillet to fish fillet. Accordingly, a simple V-cut results either in red meat remaining in the fish fillet or light muscle meat being removed in addition to the red meat. In other words, the processing results when removing the red meat with common cutting apparatuses are not accepted due to the yield losses on the one hand and the error rates on the other hand, such that the processing of tuna or comparable species has previously been carried out manually when removing the red meat.

To make it easier for people to remove the red meat, the products to be processed are cooked before processing. Cooking brings about a colour change to the effect that the "normal" muscle meat becomes (even) light(er), while the dark red meat becomes even darker (almost black). The colour change enables the person to differentiate better between the structures and the meat contents, and in par-ticular to identify the spread of the red meat better within the product. However, the manual removal of the red meat from the fish fillet has various disadvantages. On the one hand, manual removal is very time-consuming and therefore cost-intensive, especially as cooking necessitates an additional and time-intensive work step. On the other hand, manual removal leads to yield losses. In addition, the cutting result depends substantially on the experience and skill of the person who processes the product.

SUMMARY OF THE INVENTION

The object of the invention is therefore to create an arrangement which ensures automatic removal of the strip of red meat from fish fillets reliably and with optimised yield. The object of the invention is also to create a corresponding method.

This object is achieved by an arrangement of the type referred to hereinbefore, in that it is characterised by a conveying unit for transporting the fish fillet to be processed from an inlet area of the fish fillet into the arrangement to an outlet area of the fish fillet out of the arrangement in transport direction T along a transport path and, starting from the inlet area in the direction of the outlet area successively along the transport path, a first means for detecting red meat in the fish fillet to be processed, a first cutting apparatus for removing a middle, central partial strip of red meat from the fish fillet, a means for opening up the fish fillet freed from the middle partial strip in such a manner that the cut surfaces of a ventral-side partial strip of red meat still attached to the fish fillet and of a dorsal-side partial strip of red meat still attached to the fish fillet, which are produced by the first cutting apparatus, point upwards away from the conveying unit, a cutting unit for removing the ventral-side and the dorsal-side partial strip of red meat from the fish fillet, the cutting unit comprising a second cutting apparatus for removing the ventral-side partial strip and a third cutting apparatus for removing the dorsal-side partial strip, as well as a control device, at least the means for detecting red meat and the three cutting apparatuses being connected to the control device in such a manner that all cuts can be made based on the data and/or information determined by the means for detecting red meat. Due to the arrangement according to the invention, it is possible to free fish fillet containing red meat, in particular tuna fillet, efficiently and precisely from red meat by machine. Due to the three cutting apparatuses arranged one behind the other in transport direction T, the strip of red meat to be removed can be cut out of the fish fillet step by step, in that a first incision goes into the depth, towards the skin side of the fish fillet which is lying flat with the skin side on the conveying unit and the second and third incisions go mainly into the ventral region or into the dorsal region respectively, as the means for opening up or unfolding the fish fillet brings the partial fillets, i.e. the ventral-side section and the dorsal-side section of the fish fillet, into a position which allows the second and third cutting apparatus to penetrate the fish fillets, virtually parallel to the skin side. This allows the strips of red meat to be removed individually for each fish fillet, independently of the particular spread of the red meat within the fish fillet. Furthermore, this can also be used in particular to process raw, i.e. uncooked fish.

In a preferred development of the invention, in transport direction T a second means for detecting the remaining red meat in the fish fillet to be processed is arranged between the means for opening up the fish fillet and the cutting unit, wherein the second means for detecting red meat is also connected to the control device. This allows the second and third cutting apparatus to be controlled even more precisely with regard to their incision. After the first cut and the removal of a first partial strip of red meat, the second means for detecting the remaining red meat detects the exact spread of the remaining red meat in the ventral region and in the dorsal region so that complete and yield-optimised removal of the red meat is improved.

Advantageously, in transport direction T, a handling device for automatically aligning the fish fillet to be processed on the conveying unit is arranged between the first means for detecting red meat, which is arranged in the inlet area, and the second cutting apparatus for removing the middle, central partial strip, the handling device also being connected to the control device. Due to the handling device, each fish fillet to be processed can be optimally orientated in relation to the first cutting apparatus regarding alignment of the strip of red meat in order to optimise the cutting result of the first cutting apparatus.

A preferred embodiment is characterised in that the handling device comprises a robotic mechanism, e.g. a delta kinematics mechanism, with an alignment tool. With this embodiment, the fish fillets can be moved, and in particular also rotated, virtually freely in all directions which ensures individual and precise positioning of the fish fillet with a strip of red meat lying centrally on the conveying unit and aligned substantially parallel to transport direction T before the first cut, regardless of the starting location/starting position of the particular fish fillet on the conveying unit.

The first cutting apparatus preferably comprises two circular knives set in a V-shape at a fixed angle to each other and drive means for the circular knives, the two circular knives being designed to be vertically and horizontally adjustable. This ensures simple but nevertheless precise and efficient removal of the middle, central partial strip of red meat.

Especially preferably, the first cutting apparatus is arranged on a robotic mechanism, e.g. a delta kinematics mechanism, by means of which the position of the first cutting apparatus relative to the conveying unit is adjustable at least vertically and horizontally, the robotic mechanism also being connected to the control device. Particularly in combination with the handling device, this ensures optimum alignment of the fish fillets with the circular knives and of the circular knives with the fish fillets for precise incision.

Expediently, the second and the third cutting apparatus each comprise two circular knives set in a V-shape to each other as well as drive means for the circular knives. With this embodiment, the ventral-side and the dorsal-side partial strips of red meat can be removed particularly efficiently and precisely.

A particularly advantageous embodiment is characterised in that the second and the third cutting apparatus each has a knife carrier to which two knife units are assigned, each knife unit comprising a circular knife and a drive means for rotationally driving the circular knife about a central axis of rotation $M_1$, $M_2$, the two circular knives being set substantially in a V-shape to each other in a position enclosing an angle $\alpha$ and it being possible to set the size of the angle $\alpha$ by an adjustable arrangement of the knife units on the knife carrier, the offset of the two central axes of rotation $M_1$, $M_2$ to each other being equal to zero in transport direction T and the two knife units being designed and configured to be adjustable exclusively synchronously with each other. This means that each cutting apparatus can be adjusted and adapted to the individual spread of the red meat in the ventral-side and dorsal-side section to ensure yield-efficient removal of the partial strips and prevents incorrect incisions.

The second and the third cutting apparatus are preferably arranged one behind the other in transport direction T and each on a robotic mechanism, e.g. a delta kinematics mechanism, the robotic mechanisms also being connected to the control device. With the robotic mechanism, the cutting apparatuses can be optimally positioned in relation to the fish fillets to be processed before and during cutting for improved incision.

An especially preferred development is characterised in that the conveying unit comprises a plurality of conveying elements, a first conveying element in the region of the first cutting apparatus being a rotationally driven double belt with a gap running centrally and parallel to the transport direction T, while a second conveying element in the region of the cutting unit is a rotationally driven segment chain which is triangular in cross-section. With this embodiment of the conveying unit, said conveying unit is adapted to the relevant cutting apparatuses in such a manner that the fish fillets are each placed in an optimum location/position in relation to the cutting apparatus.

Advantageously, the double belt and the segment chain form a continuous conveying unit along the transport path in transport direction T, the segment chain engaging in the double belt from below through the gap, at least in the transition region from the double belt to the segment chain, for transferring the fish fillets from the double belt. In the transition region, the fish fillet is thus in contact with the double belt on the one hand and the segment chain on the other hand. This ensures continuous conveying of the fish fillets through the entire arrangement.

Especially preferably, the segment chain forms the means for opening up the fish fillets. This eliminates the need for additional means for opening up or unfolding. The dual function of the segment chain as conveying means and means for opening up ensures simple but nevertheless reliable positioning of the fish fillets below the second and third cutting apparatus. The segment chain, which is at least partly triangular in cross-section, causes the partial fillets to fold so far to the side and downwards by the force of gravity alone on leaving the double belt that the cut surfaces formed by the first cut still point upwards or at least obliquely upwards so that the second and the third cutting apparatus can penetrate into the ventral region or the dorsal region respectively—substantially parallel to the skin side—i.e. into a region in which the first cutting apparatus cannot penetrate or cannot penetrate without loss of yield.

Advantageously, the segment chain has spike-like protrusions, on its upper side pointing in the direction of the cutting unit, for fastening the fish fillets on the segment chain. This ensures additional fastening of the fish fillets on the segment chain, as a result of which the fish fillets are secured against slipping on the segment chain and can be transported accurately positioned. Another effect of the spike-like protrusions is that they assist the partial fillets to bend on both sides of the segment chain, which is triangular or more accurately roof-shaped in cross-section, i.e. they help to open up the fish fillets.

In a preferred development, devices for holding the fish down are assigned to the segment chain at least in the region of the cutting unit, in such a manner that the opened up fish fillets can be fastened on both sides of the segment chain, between device for holding the fish down and segment chain, at least when removing the ventral-side and dorsal-side partial strips. Due to transporting the fish fillets in transport direction T, the fish fillets or the partial fillets hanging down on both sides of the segment chain thread between the segment chain, which supports from below, and the device for holding the fish down, which holds from above, as a result of which the partial fillets are held securely and precisely during cutting. Together with the segment chain, the devices for holding the fish down thus ultimately form the means for opening up or they assist the segment chain at least during the opening up process, as they reliably hold the partial fillets in the spread position.

Preferably, fastening means are provided in the region of the double belt, in such a manner that the fish fillet can be fastened on the double belt at least when removing the middle, central partial strip. In other words, the fish fillet lying with the skin side flat on the double belt is optionally pressed against the double belt from above and/or sucked onto the double belt from below.

In an especially preferred development, a second cutting unit, corresponding to the first cutting unit, is arranged downstream of said first cutting unit, which comprises the second and third cutting apparatus, in transport direction T, the second cutting unit also being connected to the control device. In other words, the cutting unit is duplicated so that two incisions for removing the ventral-side partial strip can be made successively in each case and two incisions for removing the dorsal-side partial strip can be made in each case. On the one hand, this allows the processing speed to be increased. On the other hand, the accuracy when removing the strip of red meat from a fish fillet is improved.

Expediently, a third means for detecting red meat is arranged downstream of the first cutting unit and upstream of the second cutting unit in transport direction T, the third means for detecting red meat also being connected to the control device. This embodiment also improves the cutting accuracy and thus the processing result.

A preferred embodiment is characterised in that suction means for extracting the removed partial strips are arranged in the region of each cutting apparatus. As a result of this development, the cutting region is always freed of partial strips or parts that have already been removed, which particularly improves the detection of (remaining) red meat by downstream means for detecting red meat.

The object is achieved by a method which is characterised by the following steps: automatically transporting the fish fillet to be processed along a transport path from an inlet area to an outlet area in transport direction T by means of a conveying unit, automatically detecting the red meat in the fish fillet to be processed using a means for detecting red meat, automatically cutting a middle, central partial strip of red meat from the fish fillet using a first cutting apparatus, automatically opening up the fish fillet freed from the middle, central partial strip using a means for opening up, in such a manner that the cut surfaces of a ventral-side partial strip of red meat still attached to the fish fillet and a dorsal-side partial strip of red meat still attached to the fish fillet, which are formed when removing the middle, central partial strip, point upwards away from the conveying unit, automatically cutting the ventral-side and dorsal-side partial strip from the fish fillet using a second and a third cutting apparatus, the cutting apparatuses being controlled using a control device based on the data and/or information determined by the means for detecting red meat.

Preferably, the strip of red meat is automatically cut from the fish fillet in at least three steps, first the middle, central partial strip being cut from the fish fillet and subsequently first the ventral-side partial strip and then the dorsal-side partial strip or first the dorsal-side partial strip and then the ventral-side partial strip of red meat being cut from the fish fillet. The order in which the cuts are made for removing the ventral-side partial strip and for removing the dorsal-side partial strip is arbitrary.

Advantageously, the cutting, first of the ventral-side partial strip and then the dorsal-side partial strip or vice versa, is repeated in a fourth and fifth step by additional cutting apparatuses along the transport path, the red meat in the fish fillet to be processed being automatically detected again before the fourth and fifth step using a means for detecting red meat. In other words, the second and the third cut are each repeated at least once, if necessary twice or several times, in order to improve the accuracy by repeating the process, each time with renewed and thus more precise detection of the red meat still located in the fish fillet.

Preferably, each fish fillet is fastened on the conveying unit during cutting of the partial strip.

Especially preferably, all cuts of all partial strips are made by circular knives set in a V-shape to each other.

Optionally, the partial strips removed by cutting are extracted by suction.

Especially preferably, the method is carried out using an arrangement as disclosed above.

Further advantages arising from this have already been described in connection with the arrangement, which is why reference will be made to the relevant passages to avoid repetitions.

BRIEF DESCRIPTION OF THE DRAWINGS

Further expedient and/or advantageous features and developments of the arrangement and the method are disclosed herein. Especially preferred embodiments of the arrangement and the method are explained in greater detail with reference to the attached drawing. The drawing shows.

DETAILED DESCRIPTION OF THE INVENTION

Figure 1:
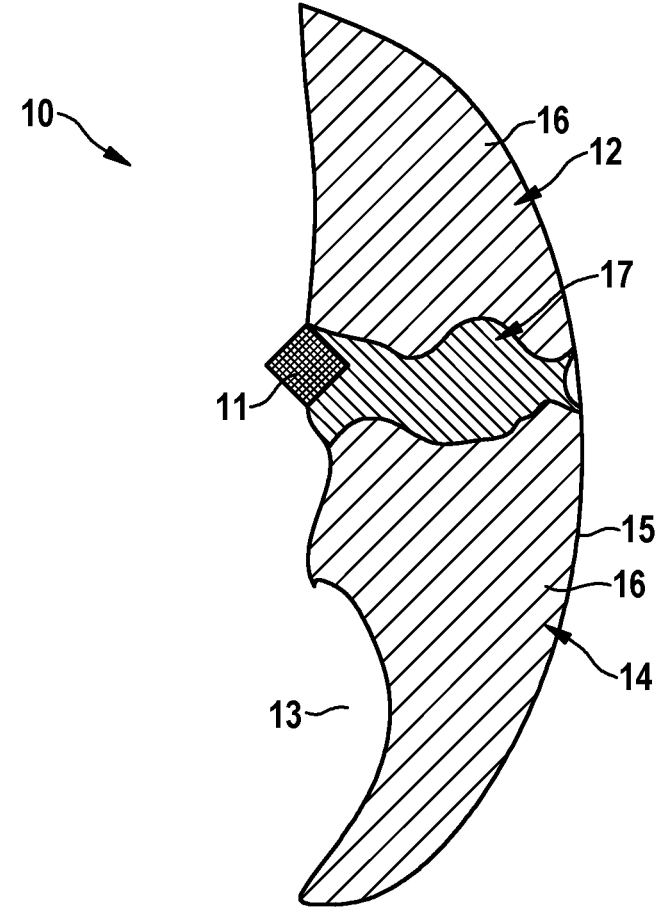
FIG. 1 is an axial cross-section through a fish fillet with a central bone and the skin side opposing the central bone.

The arrangement illustrated in the drawing is used for automatically removing a strip of red meat from a fish fillet. The invention is described using the example of the tuna which has the dark meat to be removed. However, the invention is equally applicable to other fish species which have a strip of red meat (dark meat) in their fish fillet in addition to the "normal" muscle meat. These are in particular such fish species which have this special muscle structure due to their characteristic of covering long distances.

To facilitate better understanding, the muscle structure of a tuna or a fish fillet 10 and of comparable species will first be explained based on FIGS. 1 and 2. FIG. 1 shows a single fish fillet 10 of a tuna with two fillets. The single fish fillet 10 still has a central bone 11 in the illustration. Starting from the central bone 11, the dorsal-side partial fillet 12 extends upwards towards a dorsal fin which is not shown. Starting from the central bone 11, the ventral-side partial fillet 14 extends downwards towards an abdominal cavity 13 (only indicated). The skin side 15 of the fish fillet 10 is located on the side opposite the central bone 11. The fish fillet 10 consists mainly of "normal" light muscle meat 16. However, starting from the central bone 11, a partially asymmetrical strip 17 of red meat extends towards the skin side 15. This strip 17 has an individual spread within the muscle meat 16 for each fish fillet 10.

Figure 2:
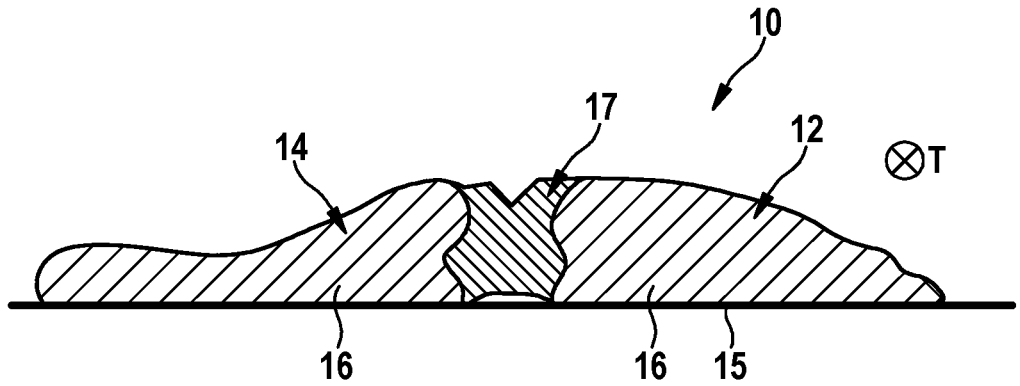
FIG. 2 is a view of the fish fillet according to FIG. 1 without the central bone, with the skin side lying on a conveying unit.

FIG. 2 shows the fish fillet 10 according to FIG. 1 without the central bone 11, the fish fillet 10 lying on the skin side 15. As a result, the strip 17 of red meat points upwards, the strip 17 being oriented substantially in transport direction T in the longitudinal direction of the fish fillet 10.

Figure 3:
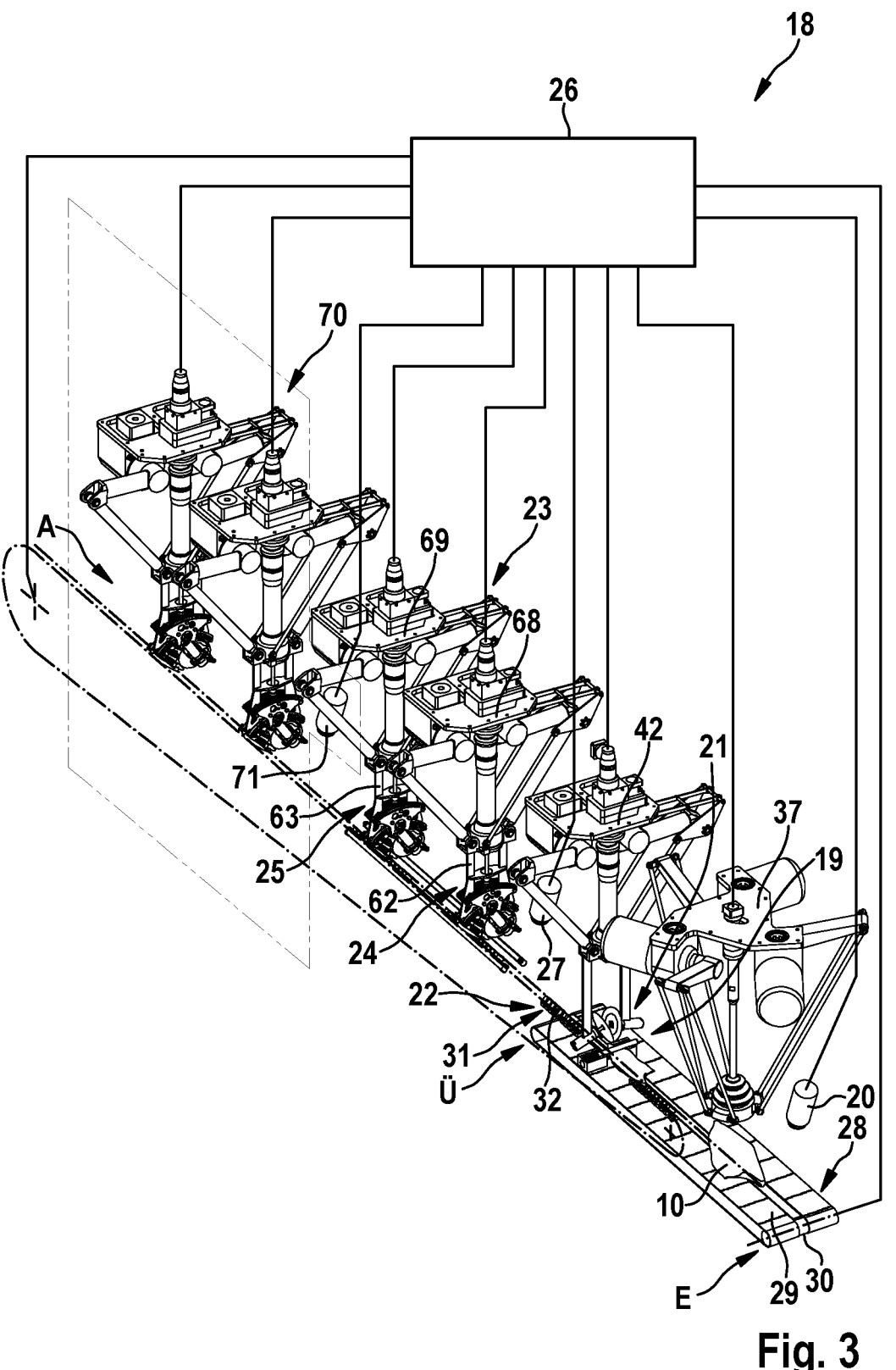
FIG. 3 is a schematic illustration of a preferred embodiment of an arrangement for automatically removing a strip consisting of red meat from a fish fillet according to FIG. 2.

The arrangement 18 illustrated from FIG. 3 onwards is designed and configured for automatically removing a strip 17 consisting of red meat, the so-called dark meat, from a fish fillet 10. This arrangement 18 is characterised according to the invention in that it is characterised by a conveying unit 19 for transporting the fish fillet 10 to be processed from an inlet area E of the fish fillet 10 into the arrangement 18 to an outlet area A of the fish fillet 10 out of the arrangement 18 in transport direction T along a transport path and, starting from the inlet area E in the direction of the outlet area A successively along the transport path, a first means 20 for detecting red meat in the fish fillet to be processed 10, a first cutting apparatus 21 for removing a middle, central partial strip of red meat from the fish fillet 10, a means 22 for opening up the fish fillet 10 freed from the middle partial strip in such a manner that the cut surfaces $F_1$ and $F_2$ of a ventral-side partial strip of red meat still attached to the fish fillet 10 and of a dorsal-side partial strip of red meat still attached to the fish fillet 10, which are produced by the first cutting apparatus 21, point upwards away from the conveying unit 19, a cutting unit 23 for removing the ventral-side and the dorsal-side partial strip of red meat from the fish fillet 10, the cutting unit 23 comprising a second cutting apparatus 24 for removing the ventral-side partial strip and a third cutting apparatus 25 for removing the dorsal-side partial strip, as well as a control device 26, at least the means 20 for identifying red meat and the three cutting apparatuses 21, 24, 25 being connected to the control device 26, in such a manner that all cuts can be made based on the data and/or information determined by the means 20 for detecting red meat.

When taken on their own or in combination with each other, the features and developments described below illustrate preferred embodiments. It is expressly pointed out that features which are summarised in the claims and/or the description and/or the drawing or are described in a common embodiment can also further develop the arrangement 18 described above in a functionally independent manner.

The conveying unit 19 comprises drive means, not explicitly shown, for rotational and preferably continuous drive. The drive means are preferably also connected to the control device 26. The first means 20 for detecting red meat may, for example, comprise a camera. Instead of the camera or in addition to the camera, the means 20 may also comprise an X-ray apparatus or other apparatus by means of which the size and/or extent and/or alignment and/or orientation and/or distribution of the strip 17 consisting of red meat can be detected within the muscle meat 16.

Preferably, in transport direction T, a second means 27 for detecting the remaining red meat in the fish fillet 10 to be processed is arranged between the means 22 for opening up the fish fillet 10 and the cutting unit 23, the second means 27 for detecting red meat also being connected to the control device 26. In other words, the second means 27 for detecting red meat is located between the first cutting apparatus 21 and the cutting unit 23. The second means 27 for detecting red meat is designed and configured in line with the first means 20 for detecting red meat.

Figure 4:
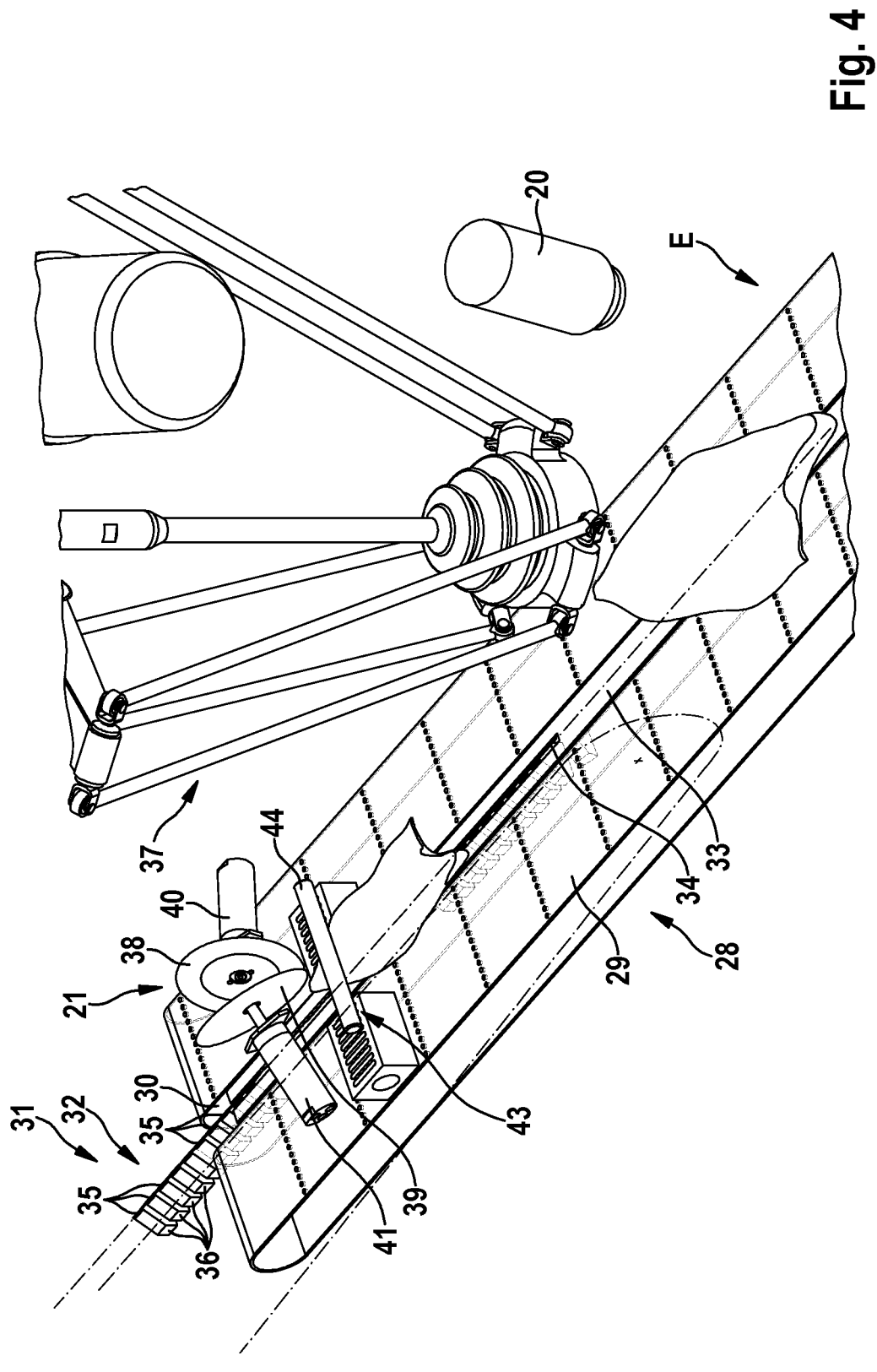
FIG. 4 is an enlarged illustration of a double belt as part of a conveying unit with first means for detecting red meat arranged above the double belt, a first cutting apparatus for removing a middle, central partial strip of red meat and a handling device for automatically aligning the fish fillet on the double belt.

FIG. 4 is an enlarged view of the inlet area E of the fish fillet 10. The conveying unit 19 comprises a plurality of conveying elements, a first conveying element 28 in the region of the first cutting apparatus 21 being a rotationally driven double belt 29 with a gap 30 running centrally and parallel to the transport direction T, while a second conveying element 31 in the region of the cutting unit 23 is a rotationally driven segment chain 32 which is triangular in cross-section. The double belt 29 may be made up of two completely separate belts with separate guiding and drive elements. In other embodiments, two partial belts may be arranged at a distance from each other on the same guiding and drive elements. The gap 30 may extend over a part of the length of the double belt 29 or over the entire length of the double belt 29, the gap 30 oriented in the transport direction T being arranged centrally in all embodiments, in such a manner that the gap 30 divides the double belt 29 symmetrically. In particular, in the event that the gap 30 extends over the entire length of the double belt 29, the gap 30 may be covered at least partially by a cover element 33.

The segment chain 32 is arranged overlapping the double belt 29. This means that the segment chain 32 along the transport path already starts before the double belt 29 ends, so that each fish fillet 10 in the overlap region is both located on the double belt 29 and is also supported by the segment chain 32. In the overlap region, the cover element 33 also has a gap 34 which allows the segment chain 32 to project, at least with its tips 35 of the individual segments 36 upwardly directed towards the cutting apparatus 21, through the gap 30 of the double belt 29 and the gap 34 of the covering element 33 beyond the plane defined by the double belt 29 (in relation to the surface of the double belt 29). In other embodiments, the segment chain 32 may itself lie with its tips 35 in or below the plane defined by the double belt 29. The double belt 29 and the segment chain 32 are individually controllable by means of the control device 26. Preferably, the double belt 29 and the segment chain 32 are synchronously controllable by means of the control device 26, in such a manner that they are driven, for example, at the same drive speed.

In transport direction T, a handling device 37 for automatically aligning the fish fillet 10 to be processed on the conveying unit 19 is arranged between the first means 20 for detecting red meat, which is arranged in the inlet area E, and the second cutting apparatus 21 for removing the middle, central partial strip, said conveying unit being arranged in the example on the double belt 29, and the handling device 37 also being connected to the control device 26. The handling device 37 preferably comprises a robotic mechanism, e.g. a delta kinematics mechanism, with an alignment tool which is not explicitly shown. The alignment tool may comprise, for example, gripping and/or suction means, using which the fish fillet 10 can be offset on the double belt 29 in transport direction T and in particular transversely to transport direction T and, above all, can also be rotated about a vertical axis so that the strip 17 of red meat is located at least partially, but preferably completely, centrally in the region of the gap 30. Especially preferably, the alignment tool may comprise, for example, a plunger or the like by means of which the fish fillet 10 can be moved and/or rotated while lying on the double belt 29.

The handling device 37 is particularly designed and configured to automatically align the fish fillets 10 on the double belt 29, in such a manner that the fish fillets 10 are pre-positioned on the segment chain 32 with regard to their location/position. The handling device 37 may also be especially preferred if the first cutting apparatus 21 comprises two circular knives 38, 39 set in a V-shape at a fixed angle to each other and drive means 40, 41 for the circular knives 38, 39, the two circular knives 38, 39 being designed to be vertically and horizontally adjustable. It may be possible to adjust the circular knives 38, 39 manually or automatically. Especially preferably, the first cutting apparatus 21 is arranged on a robotic mechanism 42, e.g. a parallel kinematics mechanism, by means of which the position of the first cutting apparatus 21 relative to the conveying unit 19, thus in the example relative to the double belt 29, is adjustable at least vertically and horizontally, the robotic mechanism 42 also being connected to the control device 26.

Optionally, fastening means 43 are provided in the region of the double belt 29, in such a manner that the fish fillet 10 can be fastened on the double belt 29 at least when removing the middle, central partial strip. In the embodiment illustrated, for example, a pressure roller 44 is provided which is arranged in transport direction T upstream of the cutting apparatus 21 above the double belt 29 and is aligned transversely to transport direction T and presses the fish fillet 10 onto the double belt 29 from above. A corresponding pressure roller 44 or another means for holding fish down may also be arranged alternatively or additionally in transport direction T downstream of the cutting apparatus 21. Suction units may also be used as fastening means 43, using which the fish fillet 10 is sucked onto the double belt 29 from below. The or each pressure roller 44 or the like may be actively driven. The corresponding drive means may be connected to the control device 26. The or each pressure roller 44 is preferably driven synchronously with the double belt 29 with regard to the drive speed.

Figure 5:
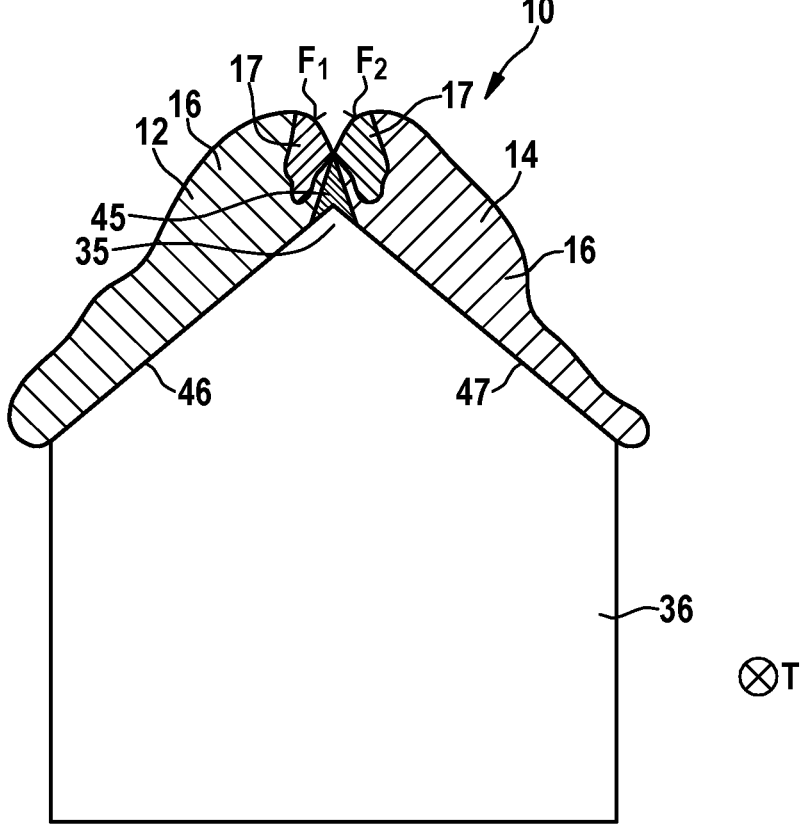
FIG. 5 is aa sectional view through a segment chain as part of a conveying unit with a fish fillet freed from the middle, central partial strip of red meat in the opened position on the segment chain.
Figure 6:
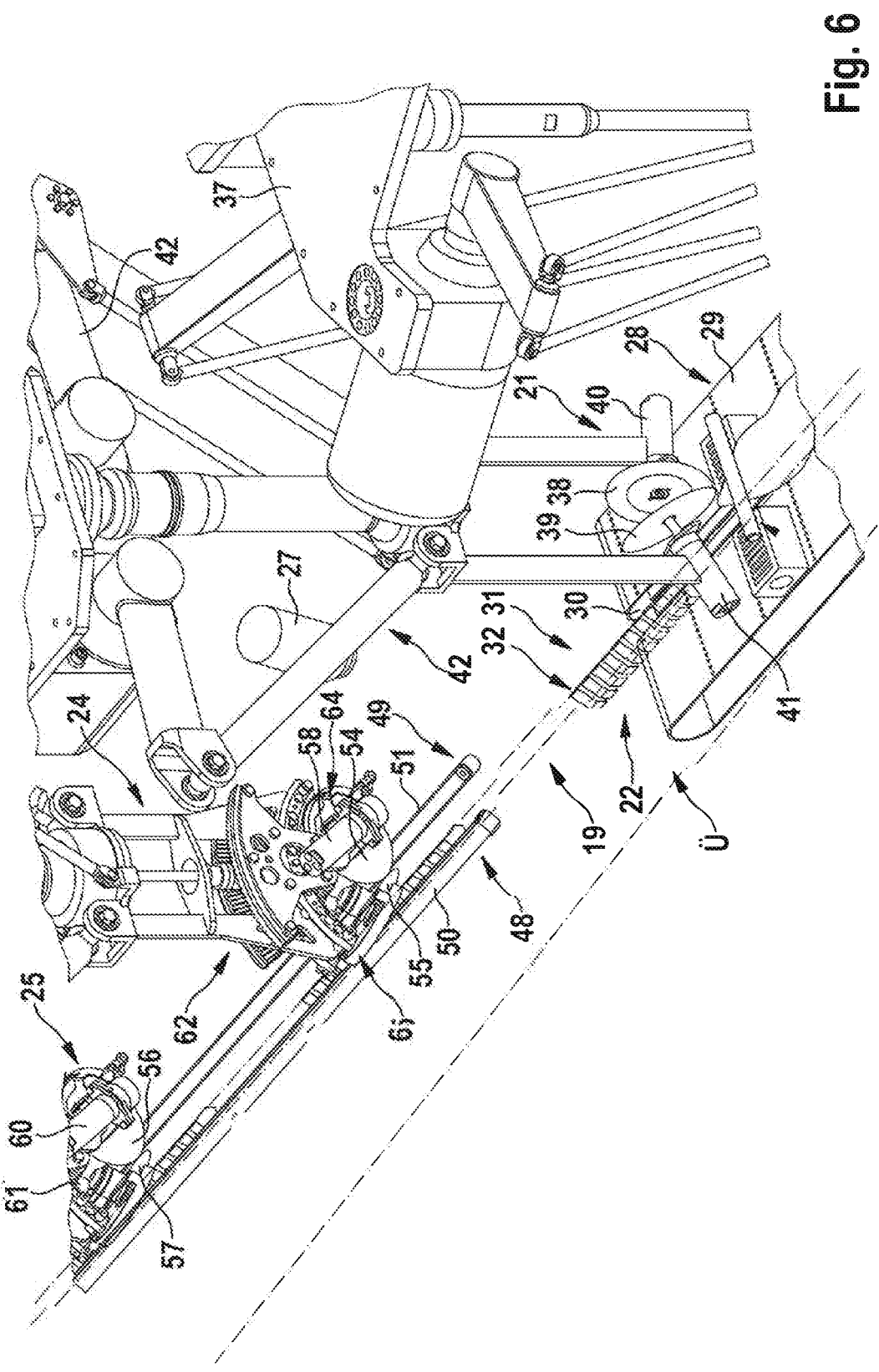
FIG. 6 is an enlarged illustration of the transition region from the double belt to the segment chain with a second means for detecting red meat and a second cutting apparatus as part of a cutting unit for removing a partial strip of red meat located on the ventral side or dorsal side of the fish fillet.
Figure 7:
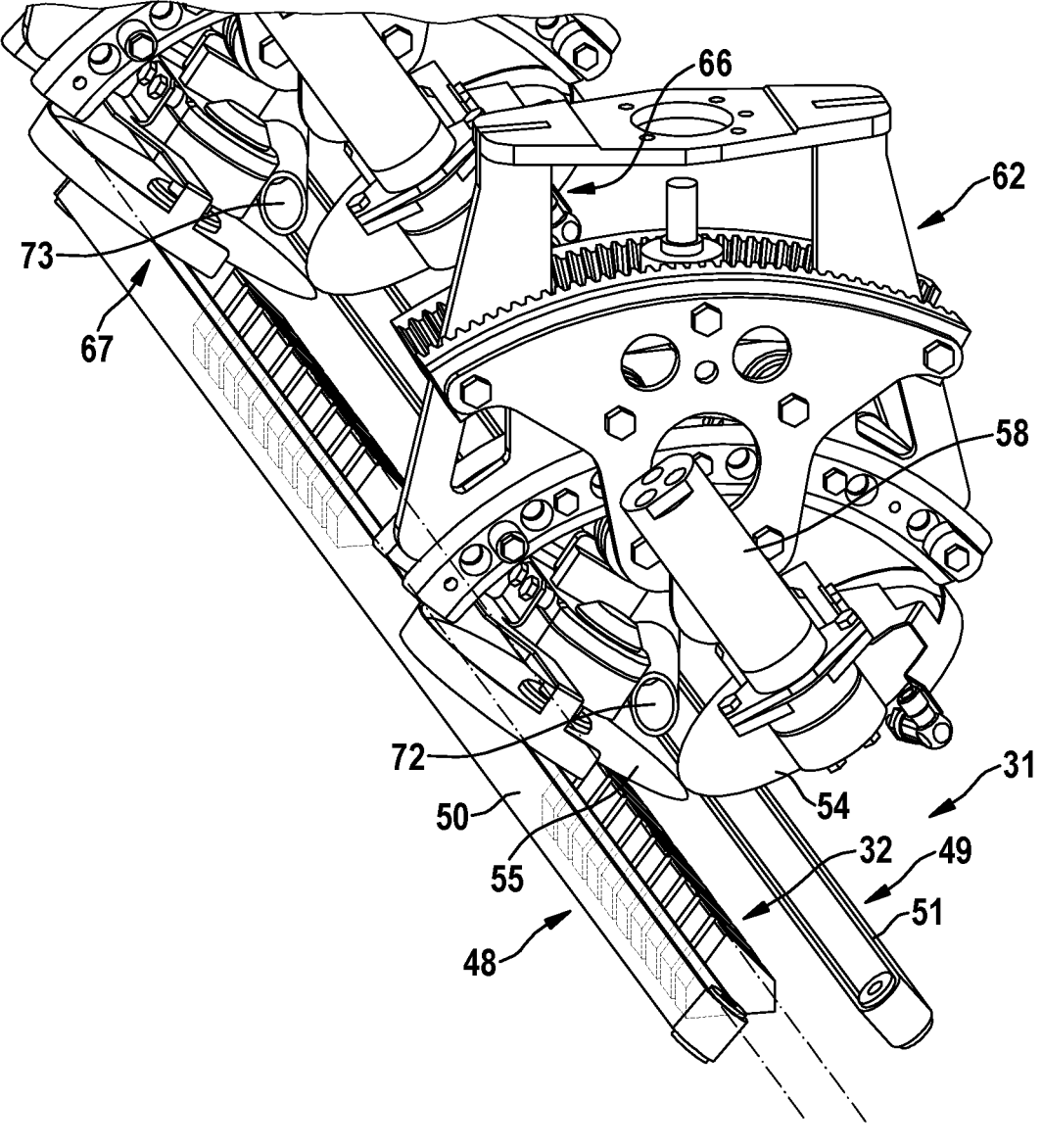
FIG. 7 is an enlarged illustration in perspective view of the second and a third cutting apparatus above the segment chain and devices for holding the fish down.
Figure 8:
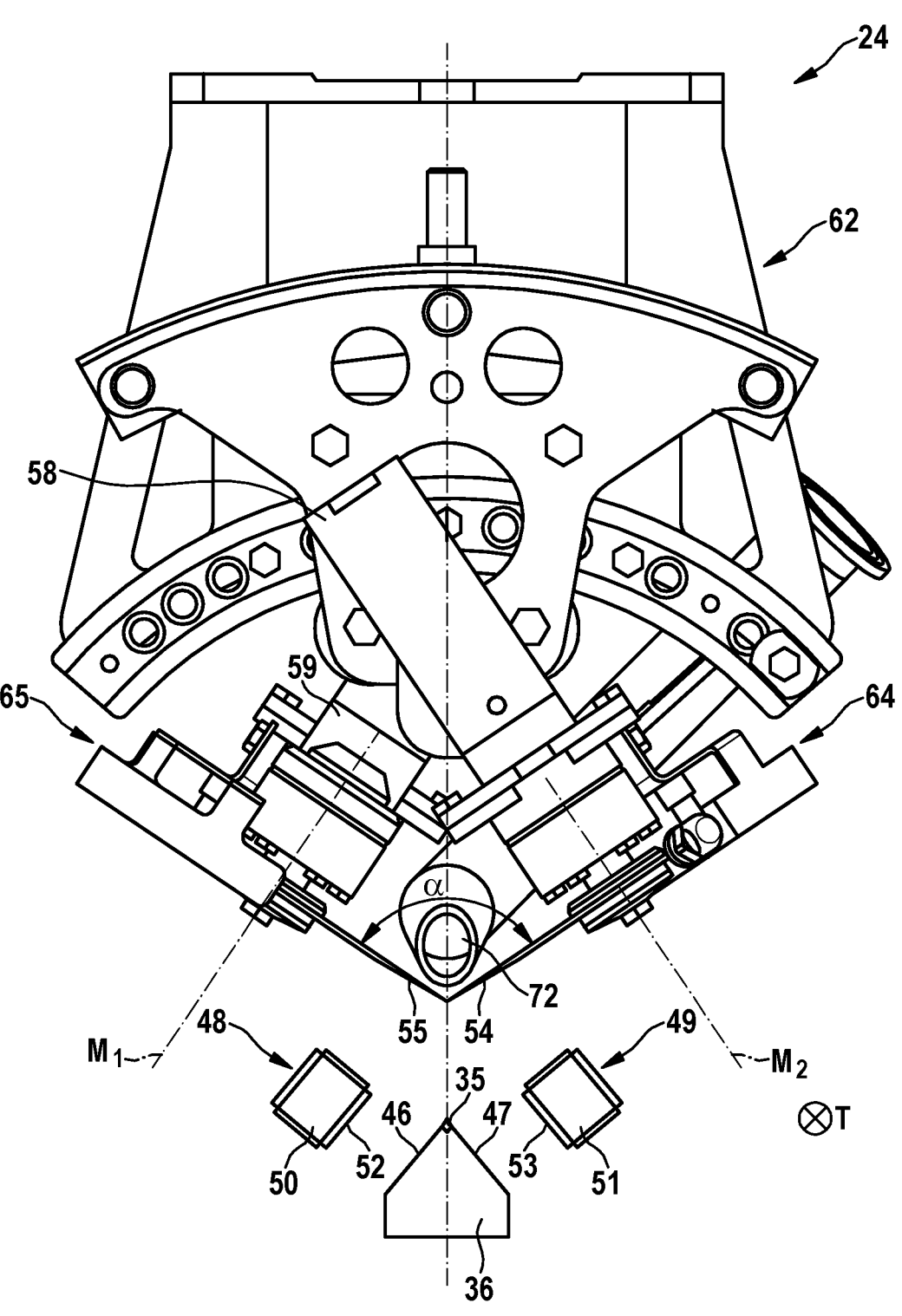
FIG. 8 is an illustration of the apparatus according to FIG. 7 viewed in transport direction T.

The double belt 29 and the segment chain 32 form a continuous conveying unit 19 along the transport path in transport direction T, the segment chain 32—as described above—engaging in the double belt 29 from below through the gap 30, at least in the transition region Ü from the double belt 29 to the segment chain 32, for transferring the fish fillets 10 from the double belt 29. The segment chain 32 is made up of a plurality of segments 36. Each segment 36 is triangular or roof-shaped in cross-section (see, for example, FIGS. 5 and 8). On the upper side pointing in the direction of the cutting apparatuses 24, 25, each segment 36 preferably has a spike-like protrusion 45. In other embodiments, it is possible for only a few of segments 36 to have such a protrusion 45, each protrusion 45 having possibly only a roughened surface or any other means for holding or penetrating the fish fillet 10.

Due to its shape and design, the segment chain 32 optionally forms the means 22 for opening up the fish fillets 10. On the double belt 29, the fish fillets 10 lie with their skin side 15 flat on the double belt 29. As a result of the fish fillets 10 being transferred by the segment chain 32, the partial fillets 12, 14 drop—assisted by removal of the middle, central partial strip of red meat—to the side and downwards after leaving the double belt 29, so that the partial fillets 12, 14, which are still connected to each other, lie with their skin side 15 on the surfaces 46, 47, running obliquely downwards, of the segments 36, as a result of which the cut surfaces $F_1$ and $F_2$ are brought from a position facing each other into a position in which the cut surfaces $F_1$ and $F_2$ are directed further upwards in the direction of the cutting apparatuses 24, 25 (see in particular FIG. 5). Other means 22 for opening up the fish fillets 10 can also be used additionally and separately to the segment chain 32. For example, means for actively unfolding the partial fillets may be arranged above the segment chain.

Preferably, devices 48, 49 for holding the fish down are assigned to the segment chain 32 at least in the region of the cutting unit 23, in such a manner that the opened up fish fillets 10 can be fastened on both sides of the segment chain 32, between device 48, 49 for holding the fish down and segment chain 32, at least when removing the ventral-side and dorsal-side partial strips. The devices 48, 49 for holding the fish down may be, for example, round profiles. Preferably, however, the devices 48, 49 for holding the fish down are rotationally driven conveyor belts 50, 51, the guiding surfaces 52, 53 of which are preferably aligned parallel to the surfaces 46, 47 of the segments 36 (see in particular FIG. 8). The distance of the guiding surfaces 52, 53 from the surfaces 46, 47 of the segments 36 is adjustable. The devices 48, 49 for holding the fish down are preferably designed and configured to assist the segment chain 32, as means 22 for opening up, as an active means of helping to open up the partial fillets 12, 14 and for holding the partial fillets 12, 14 in the spread position.

The second and the third cutting apparatus 24, 25 are arranged above the segment chain 32 with the devices 48, 49 for holding the fish down. The second and the third cutting apparatus 24, 25 each comprise two circular knives 54, 55; 56, 57 set in a V-shape at a fixed angle to each other and drive means 58, 59; 60, 61 for the circular knives 54 to 57. In a simple embodiment, the cutting apparatuses 24, 25 may be designed like the cutting apparatus 21, i.e. with two circular knives 54, 55; 56, 57 set in a V-shape at a fixed angle to each other which knives are designed to be vertically and horizontally adjustable. Particularly in the second and third cutting apparatus 24, 25, ring blades, so-called Whizard knives, may be used instead of the circular knives 54 to 57.

Preferably, the second and the third cutting apparatus 24, 25 each has a knife carrier 62, 63 to which two knife units 64, 65; 66, 67 are assigned, each knife unit 64 to 67 comprising a circular knife 54 to 57 and a drive means 58 to 61 for rotationally driving the circular knife 54 to 57 about a central axis of rotation $M_1$, $M_2$, the two circular knives 54, 55; 56, 57 being set substantially in a V-shape to each other in a position enclosing an angle α and it being possible to set the size of the angle α by an adjustable arrangement of the knife units 64 to 67 on the knife carrier 62, 63, the offset of the two central axes of rotation $M_1$, $M_2$ to each other being equal to zero in transport direction T and the two knife units 64, 65; 66, 67 being designed and configured to be adjustable exclusively synchronously with each other.

The second and the third cutting apparatus 24, 25 are preferably arranged one behind the other in transport direction T and each on a robotic mechanism 68, 69, e.g. a parallel kinematics mechanism, the robotic mechanisms 68, 69 also being connected to the control device 26. In the embodiment shown, first the second cutting apparatus 24 for removing the ventral-side strip and subsequently the third cutting apparatus 25 for removing the dorsal-side partial strip are arranged in transport direction T. However, the order of the cutting apparatuses 24, 25 may also be reversed.

A second cutting unit 70, corresponding to the first cutting unit 23, is optionally arranged downstream of said first cutting unit 23, which comprises the second and third cutting apparatus 24, 25, in transport direction T, the second cutting unit 70 also being connected to the control device 26. Further cutting units with corresponding design may be provided. A third means 71 for detecting red meat is arranged downstream of the first cutting unit 23 and upstream of the second cutting unit 70 in transport direction T, the third means 71 for detecting red meat also being connected to the control device 26. The third means 71 for detecting red meat is designed and configured in accordance with the first means 20 and the second means 27 for detecting the red meat.

Optionally, suction means 72, 73 for extracting the removed partial strips are arranged in the region of individual cutting apparatuses 21, 24, 25 or each cutting apparatus 21, 24, 25. For example, suction pipes are arranged in transport direction T downstream of the respective pairs of circular knives 38, 39; 54, 55; 56, 57, the suction openings of the suction pipes being directed contrary to transport direction T. All components for processing the fish fillets 10, i.e. at least the means 20, 27, 71 for detecting red meat and all cutting apparatuses 21, 24, 25, are arranged above the conveying unit 19 so that processing of the fish fillets 10 takes place from above.

All components involved in the processing process, i.e. in particular the means 20, 27, 71 for detecting red meat, all cutting apparatuses 21, 24, 25, either directly or via the robotic mechanisms 42, 68, 69, as well as the handling device 37 and the drive means of the conveying elements 28, 31 are preferably connected to the control device 26 via wires or wirelessly, the control device 26 comprising, among other things, an evaluation unit, at least one memory unit and at least one control module for actively controlling the individual components. The control device 26 may be designed as a programmable logic controller or as a microprocessor-based controller.

In the following, the method for automatically removing a strip 17 consisting of red meat, the so-called dark meat, from a fish fillet 10 is explained in greater detail based on the drawing, the method being characterised by the combination of the following steps:

The fish fillets 10 to be processed are transported automatically along a transport path from an inlet area E to an outlet area A in transport direction T by means of a conveying unit 19. Along the transport path, first of all a means 20 for detecting red meat automatically detects the red meat in the fish fillet 10 to be processed. Subsequently, a middle, central partial strip of red meat is automatically cut from the fish fillet 10 using a first cutting apparatus 21. After the first cut, the fish fillet 10 freed from the middle, central partial strip using a means 22 for opening up is automatically opened up, in such a manner that the cut surfaces $F_1$, $F_2$ of a ventral-side partial strip of red meat still attached to the fish fillet 10 and a dorsal-side partial strip of red meat still attached to the fish fillet 10, which are formed when removing the middle, central partial strip, point upwards away from the conveying unit 19, In the opened position, the ventral-side and dorsal-side partial strips are automatically cut from the fish fillet 10 using a second and a third cutting apparatus 24, 25. To execute the automated cuts for removing all three partial strips from the fish fillet 10, the cutting apparatuses 21, 24, 25 are controlled using a control device 26 based on the data and/or information determined by the means 20 for detecting red meat.

Preferably, the data and/or information from the drive means for the conveying unit 19 is also used when controlling the cutting apparatuses 21, 24, 25. The multi-stage removal of the entire strip 17 of red meat is in the foreground of the method according to the invention. The strip 17 of red meat is automatically cut from the fish fillet 10 in at least three steps, first the middle, central partial strip being cut from the fish fillet 10 and subsequently first the ventral-side partial strip and then the dorsal-side partial strip or first the dorsal-side partial strip and then the ventral-side partial strip of red meat being cut from the fish fillet.

Optionally, before the first cut, a handling device 37 is used to automatically bring the fish fillet 10 into the optimum position in relation to the cutting apparatus 21, in which position the strip 17 to be removed is located at least predominantly centrally in the region of a gap 30 of a double belt 29 and in its longitudinal extension is aligned substantially parallel to transport direction T. To do this, the handling device 37 is controlled by the control device 26. In the first automatic cut, the fish fillet 10 is preferably held on the double belt 29 using a fastening means 43 or is pressed onto and/or sucked onto said double belt. After the first cut, the fish fillet 10 is transferred from the double belt 29 by a segment chain 32 of the conveying unit 19, the fish fillet 10 automatically opening after leaving the double belt 29 on the segment chain 32—preferably by the force of gravity alone—in that the two partial fillets 12, 14 fold sideways and downwards. Optionally, however, the partial fillets 12, 14 may also be brought into an opened position actively.

After the first cut by the cutting apparatus 21 and before the second cut by the cutting apparatus 24, the residual/remaining red meat is preferably automatically detected again in the fish fillet 10 to be processed using a means 27 for detecting red meat. In the second and third automatic cut, the fish fillet 10 is preferably held on the segment chain 32 by means of devices 48, 49 for holding the fish down. The cutting apparatuses 24 and 25, just as the cutting apparatus 21, may be directly controlled. Preferably, however, the cutting apparatuses 21, 24, 25 are controlled by the control device 26 via a robotic mechanism 42, 68, 69.

All cuts are preferably made with circular knives 38, 39; 54, 55; 56, 57 arranged in pairs, which are set in a V-shape at an angle to each other. The second and the third cut at least can also be made with a Whizard knife. Preferably, the cutting, first of the ventral-side partial strip and then the dorsal-side partial strip or vice versa, is repeated in a fourth and fifth cut by additional cutting apparatuses along the transport path, the red meat in the fish fillet 10 to be processed being automatically detected again before the fourth and fifth cut using a means 71 for detecting red meat. Preferably, the partial strips removed by automatic cutting are automatically extracted by suction.

Especially preferably, the method is carried out using an arrangement 18 according to one or more of claims 1 to 18.

What is claimed is:

1. An arrangement, designed and configured for automatically removing a strip of dark meat from a fish fillet, comprising:

a conveying unit for transporting the fish fillet to be processed from an inlet area of the arrangement to an outlet area of the arrangement in a transport direction along a transport path; and starting from the inlet area, along the transport path towards the outlet area:

a first means for detecting dark meat in the fish fillet to be processed;

a delta kinematics mechanism for moving the fish filet;

a first cutting apparatus for removing a middle, central partial strip of dark meat from the fish fillet to define a middle void in a center of the fish filet, the first cutting apparatus downstream along the transport direction from the delta kinematics mechanism toward the outlet area; and a first cutting unit for removing a ventral-side partial strip and a dorsal-side partial strip of dark meat from the fish fillet, the first cutting unit comprising a second cutting apparatus that engages a first cut surface within the middle void to remove the ventral-side partial strip and a third cutting apparatus that engages a second cut surface within the middle void to remove the dorsal-side partial strip; and a controller connected to at least the first means for detecting dark meat and the first cutting apparatus, the second cutting apparatus, and the third cutting apparatus, the controller being a programable logic controller or a microprocessor-based controller, the controller programmed to control at least the first means for detecting dark meat and the first cutting apparatus, the second cutting apparatus, and the third cutting apparatus to remove the middle, central partial strip of dark meat and the ventral-side and the dorsal-side partial strips based on data and/or information determined by the first means for detecting dark meat;

wherein the conveying unit comprises a plurality of conveying elements, including:

a first conveying element disposed in a region of the first cutting apparatus and comprising a rotationally driven double belt with a gap, the gap running centrally and parallel to the transport direction; and a second conveying element disposed in a region of the first cutting unit and comprising a rotationally driven segment chain, the segment chain including a triangular cross-sectional shape.

2. The arrangement according to claim 1, wherein the first cutting apparatus comprises two circular knives set in a V-shape at a fixed angle to each other and a drive, wherein the two circular knives are vertically and horizontally adjustable.

3. The arrangement according to claim 1, further comprising a robotic mechanism, the first cutting apparatus being arranged on the robotic mechanism by which a position of the first cutting apparatus relative to the conveying unit is adjustable at least vertically and horizontally, wherein the robotic mechanism is also connected to the controller.

4. The arrangement according to claim 1, wherein:

the second cutting apparatus comprises two circular knives set in a V-shape at a fixed angle to each other and drives for the two circular knives; and the third cutting apparatus comprises two circular knives set in a V-shape at a fixed angle to each other and drives for the two circular knives of the third cutting apparatus.

5. The arrangement according to claim 1, wherein:

the second and the third cutting apparatus each comprise a respective knife carrier, wherein two knife units are assigned to each of the knife carriers.

6. The arrangement according to claim 1, further comprising a respective robotic mechanism for each of the second cutting apparatus and the third cutting apparatus, wherein the second cutting apparatus and the third cutting apparatus are arranged one behind the other in the transport direction and each on a respective one of the robotic mechanisms, wherein the robotic mechanisms are also connected to the controller.

7. The arrangement according to claim 1, wherein:

the double belt and the segment chain form the conveying unit along the transport path in the transport direction; and the segment chain engages in the double belt from below through the gap, at least in a transition region from the double belt to the segment chain, for transferring the fish fillet from the double belt.

8. The arrangement according to claim 1, wherein the segment chain further forms a means for opening up the fish fillet.

9. The arrangement according to claim 1, wherein the segment chain has protrusions on an upper side pointing in a direction of the first cutting unit, the protrusions for fastening the fish fillet on the segment chain.

10. The arrangement according to claim 1, further comprising one or more devices for holding the fish fillet down assigned to the segment chain at least in the region of the first cutting unit, in such a manner that the fish fillet is fastened on an upper side of the segment chain between the one or more devices for holding the fish fillet down and the segment chain.

11. The arrangement according to claim 1, further comprising a fastening means provided in a region of the double belt, in such a manner that the fish fillet is fastened on the double belt at least when removing the middle, central partial strip to define the middle void in the center of the fish filet.

12. The arrangement according to claim 1, further comprising a second cutting unit arranged downstream, in the transport direction, of said first cutting unit, the second cutting unit comprising cutting apparatuses, wherein the second cutting unit is also connected to the controller.

13. The arrangement according to claim 1, further comprising at least one suction means arranged in each of the first cutting apparatus, the second cutting apparatus, and the third cutting apparatus for extracting the removed middle, central partial strip, the ventral-side partial strip and the dorsal-side partial strip by suction.

14. The arrangement according to claim 1, wherein the delta kinematics mechanism is disposed in the transport direction between the first means for detecting dark meat, which is arranged in the inlet area, and the first cutting apparatus.

15. The arrangement according to claim 1, wherein the segment chain further forms a means for opening up the fish fillet freed from the middle partial strip in such a manner that the first cut surface of the ventral-side partial strip of dark meat is still attached to the fish fillet and the second cut surface of the dorsal-side partial strip of red meat is still attached to the fish fillet and such that the first and second cut surfaces point upwards away from the conveying unit.

16. A method for automatically removing a strip of dark meat from a fish fillet using an arrangement, the arrangement comprising:

a conveying unit for transporting the fish fillet to be processed from an inlet area of the arrangement to an outlet area of the arrangement in a transport direction along a transport path; and starting from the inlet area, along the transport path towards the outlet area:

a first means for detecting dark meat in the fish fillet to be processed;

a delta kinematics mechanism for moving the fish filet;

a first cutting apparatus for removing a middle, central partial strip of dark meat from the fish fillet to define a middle void in a center of the fish filet, the first cutting apparatus downstream along the transport direction from the delta kinematics mechanism toward the outlet area; and a first cutting unit for removing a ventral-side partial strip and a dorsal-side partial strip of dark meat from the fish fillet, the first cutting unit comprising a second cutting apparatus that engages a first cut surface within the middle void to remove the ventral-side partial strip and a third cutting apparatus that engages a second cut surface within the middle void to remove the dorsal-side partial strip; and a controller connected to at least the first means for detecting dark meat and the first cutting apparatus, the second cutting apparatus, and the third cutting apparatus, the controller being a programable logic controller or a microprocessor-based controller, the controller programmed to control at least the first means for detecting dark meat and the first cutting apparatus, the second cutting apparatus, and the third cutting apparatus to remove the middle, central partial strip of dark meat and the ventral-side and the dorsal-side partial strips based on data and/or information determined by the first means for detecting dark meat;

wherein the conveying unit comprises a plurality of conveying elements, including:

a first conveying element disposed in a region of the first cutting apparatus and comprising a rotationally driven double belt with a gap, the gap running centrally and parallel to the transport direction; and a second conveying element disposed in a region of the first cutting unit and comprising a rotationally driven segment chain, the segment chain including a triangular cross-sectional shape, the method comprising the following steps:

automatically transporting the fish fillet to be processed along the transport path from the inlet area to the outlet area in the transport direction by the conveying unit;

automatically detecting the dark meat in the fish fillet to be processed using the first means for detecting dark meat;

automatically cutting the middle, central partial strip of the dark meat from the fish fillet using the first cutting apparatus to define the middle void in the center of the fish filet;

automatically opening up the fish fillet freed from the middle, central partial strip, in such a manner that the ventral-side partial strip of dark meat is still attached to the fish fillet and the dorsal-side partial strip of dark meat is still attached to the fish fillet and such that the first and second cut surfaces point upwards away from the conveying unit; and automatically cutting the ventral-side partial strip and the dorsal-side partial strip from the fish fillet using the second cutting apparatus to engage the first cut surface within the middle void to remove the ventral-side partial strip and using the third cutting apparatus to engage the second cut surface within the middle void to remove the dorsal-side partial strip from the fish fillet; and wherein the second and third cutting apparatuses are controlled using the controller based on the data and/or information determined by the first means for detecting dark meat.

17. The method according to claim 16, wherein:

the strip of dark meat is automatically cut from the fish fillet in at least three steps:

removing the middle, central partial strip to define the middle void in the center of the fish filet; and subsequently engaging the first cut surface within the middle void to remove the ventral-side partial strip and then engaging the second cut surface within the middle void to remove the dorsal-side partial strip or engaging the second cut surface within the middle void to remove the dorsal-side partial strip and then engaging the first cut surface within the middle void to remove the ventral-side partial strip of dark meat.

18. The method according to claim 17, wherein engaging the first cut surface within the middle void to remove the ventral-side partial strip and then engaging the second cut surface within the middle void to remove the dorsal-side partial strip or vice versa, is repeated in a fourth and fifth step by additional cutting apparatuses along the transport path, wherein the dark meat in the fish fillet to be processed is automatically detected again before the fourth and fifth step.

19. The method according to claim 16, wherein the fish fillet is fastened to the conveying unit during the removing of the middle, central partial strip, the dorsal-side partial strip, and the ventral-side partial strip.

20. The method according to claim 16, wherein the step of automatically cutting the middle, central partial strip of dark meat from the fish fillet comprises automatically cutting with circular knives set in a V-shape to each other.

21. The method according to claim 16, wherein the middle, central partial strip, the dorsal-side partial strip, and the ventral-side partial strip are extracted by suction.

* * * * *